United States Patent
Lebon et al.

(10) Patent No.: US 9,797,382 B2
(45) Date of Patent: Oct. 24, 2017

(54) METHOD, SYSTEM AND DEVICE FOR CONTRIBUTING TO THE ASSEMBLY OF A WIND TURBINE

(71) Applicant: Soletanche Freyssinet, Rueil Malmaison (FR)

(72) Inventors: Jean-Daniel Lebon, Saint Germain en Laye (FR); Charles-Emmanuel Ferrand De La Conte, Le Chesnay (FR); Erik Mellier, Paris (FR)

(73) Assignee: Soletanche Freyssinet, Rueil Malmaison (FR)

( * ) Notice: Subject to any disclaimer, the term of this patent is extended or adjusted under 35 U.S.C. 154(b) by 486 days.

(21) Appl. No.: 14/464,346

(22) Filed: Aug. 20, 2014

(65) Prior Publication Data
US 2014/0356185 A1 Dec. 4, 2014

Related U.S. Application Data

(62) Division of application No. 12/815,072, filed on Jun. 14, 2010, now Pat. No. 8,839,515.

(30) Foreign Application Priority Data

Jun. 15, 2009 (FR) ..................................... 09 53990

(51) Int. Cl.
*F03D 13/00* (2016.01)
*F03D 11/04* (2006.01)
(Continued)

(52) U.S. Cl.
CPC ............ *F03D 11/045* (2013.01); *F03D 13/10* (2016.05); *F03D 13/20* (2016.05); *F03D 13/22* (2016.05);
(Continued)

(58) Field of Classification Search
CPC ........ F03D 11/045; F03D 13/22; F03D 13/20; F03D 1/001; F03D 13/10; Y02E 10/728; Y02E 10/726; Y02E 10/727; Y02E 10/721; Y02P 70/523; Y10T 29/49316; Y10T 29/49998; Y10T 29/49229; Y10T 29/49895; Y10T 29/53974;
(Continued)

(56) References Cited

U.S. PATENT DOCUMENTS 3,672,115 A 6/1972 Abe et al.
6,357,549 B1 * 3/2002 Brennan ................ B66B 9/187
182/103

(Continued)

FOREIGN PATENT DOCUMENTS

DE 10 2005 025646 12/2006
WO 96/10130 4/1996
(Continued)

*Primary Examiner* — Jun Yoo
(74) *Attorney, Agent, or Firm* — Dentons US LLP

(57) ABSTRACT

A contribution is made to the assembly of a wind turbine intended to comprise, in a final assembly condition, a tower (2) surmounted by a nacelle (4) cooperating with a rotor (5) receiving a plurality of blades (3a-3c). To this end, a temporary association is made between at least some blades from said plurality of blades and the tower, so that said blades extend substantially in the longitudinal direction of the tower.

2 Claims, 6 Drawing Sheets

(51) Int. Cl.
*F03D 13/20* (2016.01)
*F03D 13/10* (2016.01)

(52) U.S. Cl.
CPC ... *F05B 2230/61* (2013.01); *F05B 2230/6102* (2013.01); *F05B 2240/912* (2013.01); *F05B 2240/95* (2013.01); *Y02E 10/726* (2013.01); *Y02E 10/727* (2013.01); *Y02E 10/728* (2013.01); *Y02P 70/523* (2015.11); *Y10T 29/49229* (2015.01); *Y10T 29/49316* (2015.01); *Y10T 29/49895* (2015.01); *Y10T 29/49998* (2015.01); *Y10T 29/53974* (2015.01)

(58) Field of Classification Search
CPC ............ F05B 2240/912; F05B 2240/95; F05B 2230/6102; F05B 2230/61; E04H 12/342; E04H 12/344; B66C 1/108; B66C 23/185; B66C 23/207
See application file for complete search history.

(56) References Cited

U.S. PATENT DOCUMENTS

| | | | |
|---|---|---|---|
| 6,522,025 B2 | 2/2003 | Willis et al. | |
| 7,739,843 B2 | 6/2010 | Cortina-Cordero | |
| 8,069,634 B2 | 12/2011 | Livingston et al. | |
| 8,201,787 B2 | 6/2012 | Ingram et al. | |
| 8,281,546 B2 | 10/2012 | Thompson | |
| 8,316,614 B2 | 11/2012 | Soe-Jensen | |
| 8,397,382 B2 | 3/2013 | Anasis et al. | |
| 2003/0183594 A1 | 10/2003 | Torres Martinez | |
| 2006/0120809 A1 | 6/2006 | Ingram et al. | |
| 2007/0243063 A1 | 10/2007 | Schellstede | |
| 2008/0203246 A1 | 8/2008 | Ingram et al. | |
| 2010/0005656 A1 | 1/2010 | Vangsy | |
| 2010/0018055 A1 | 1/2010 | Lynderup et al. | |
| 2010/0189531 A1 | 7/2010 | Christensen | |
| 2012/0076663 A1 | 3/2012 | From | |
| 2012/0131880 A1 | 5/2012 | Delago et al. | |
| 2012/0219364 A1 | 8/2012 | Li et al. | |
| 2012/0266796 A1 | 10/2012 | Roodenburg et al. | |

FOREIGN PATENT DOCUMENTS

| | | |
|---|---|---|
| WO | 03/100248 | 12/2003 |
| WO | 2010126369 A1 | 11/2010 |
| WO | 2011153675 A1 | 12/2011 |

\* cited by examiner

METHOD, SYSTEM AND DEVICE FOR CONTRIBUTING TO THE ASSEMBLY OF A WIND TURBINE

This application is a divisional of U.S. application Ser. No. 12/815,072, filed Jun. 14, 2010, which claims priority from French Patent Application No. 09-53990, filed Jun. 15, 2009, the contents of each is incorporated by reference herein in its entirety.

BACKGROUND OF THE INVENTION

The present invention relates to the assembly of a wind turbine.

In its final assembly condition, a wind turbine generally comprises a tower surmounted by a nacelle cooperating with a rotor receiving a plurality of blades.

In order to reach said final condition, assembly operations of the different constituent elements of the wind turbine are carried out.

These operations are generally complex and expensive.

This is the case in particular with regard to mounting the blades. This is explained in particular by the fact that the blades are bulky and their point of attachment on the wind turbine is high up.

Said mounting is carried out in standard fashion by firstly fixing all or part of the blades onto the rotor and by lifting the "rotor+blades" assembly up to the apex of the vertically-positioned tower. The lifting means necessary for this purpose, for example cranes, are heavy and complex.

The situation is particularly difficult in the case of an offshore wind turbine, i.e. that is intended to be located in the open sea.

In fact, conventionally, the constituent elements of such a wind turbine are transported separately, then assembled at sea.

By way of example, habitually, the rotor and tower are transported separately out to sea on a transport vessel. The three blades (or only two of the three blades in order to limit the bulk and allow storage on the transport vessel) are already fixed onto the rotor during transport. Then, once at sea, the rotor and the blades are lifted together in order to be positioned at the apex of the tower, using cranes mounted on barges or fixed platforms.

This work at sea is relatively lengthy, complex and expensive. The level of safety is also sometimes lower than that of work carried out on land.

An object of the present invention is to limit at least some of these drawbacks.

SUMMARY OF THE INVENTION

The invention thus proposes a method for contributing to the assembly of a wind turbine intended to comprise, in a final assembly condition, a tower surmounted by a nacelle cooperating with a rotor receiving a plurality of blades. Said method comprises a temporary association with the tower of at least some blades from said plurality of blades, so that said blades extend substantially in the longitudinal direction of the tower.

Such a method makes it possible to obtain a wind turbine, in a non-final assembly condition. Said condition can facilitate the possible subsequent assembly of the blades onto the rotor. It can thus be used as an intermediate assembly condition of the wind turbine. It can also be used for transporting the wind turbine in a simple and stable manner.

According to advantageous variants of the invention that can be mutually combined in any manner possible to envisage:
- the temporary association with the tower of at least some blades from said plurality of blades comprises the temporary attachment of said blades onto a support structure secured to the tower, and/or
- when the nacelle surmounts the tower, a relative movement between at least some of the blades fixed temporarily onto the support structure and the nacelle is carried out so that said blades are positioned close to the rotor, and/or
- said blades are moved substantially about a longitudinal axis of the tower, and/or
- said blades are moved along a track arranged in the support structure, and/or
- the nacelle is rotated substantially about a longitudinal axis of the tower, and/or
- housings are angularly distributed around the rotor in order to receive respective blades from said plurality of blades, and the rotor is rotated so as to position said blades successively opposite the respective rotor housings, and/or
- when a blade is substantially opposite the respective rotor housing, said blade is fixed into said respective rotor housing, and/or
- when a first blade has been fixed into the respective rotor housing, the rotor is rotated so as to position a second blade opposite the respective rotor housing, the rotation of the rotor leading to the release of the first blade from the support structure, and/or
- the temporary association with the tower of at least some blades from said plurality of blades is followed by fixing said blades onto the rotor, releasing said blades from the support structure secured to the tower, and detaching said support structure from the tower, and/or
- the temporary association with the tower of at least some blades from said plurality of blades is carried out in a temporary position on land, and said blades are fixed onto the rotor once a final position of the wind turbine is reached, and/or
- the final position of the wind turbine is located in a marine environment, and transportation is arranged to the marine environment of an assembly comprising the tower and the blades temporarily associated with the tower, by associating at least one float with said assembly, so as to provide a stable flotation of said assembly in the marine environment, the float surrounding said assembly and a lower portion of said assembly extending below said float, and by causing said assembly and the associated float to travel in the marine environment until the final position of the wind turbine is reached.

The invention further proposes a system for contributing to the assembly of a wind turbine intended to comprise, in a final assembly condition, a tower surmounted by a nacelle cooperating with a rotor receiving a plurality of blades, the system being arranged in order to implement the above mentioned method. The system comprises means arranged in order to temporarily associate with the tower at least some blades from said plurality of blades, so that said blades extend substantially in the longitudinal direction of the tower.

The invention proposes moreover a support structure for contributing to the assembly of a wind turbine intended to comprise, in a final assembly condition, a tower surmounted by a nacelle cooperating with a rotor receiving a plurality of blades. The support structure is arranged for being secured to the tower and for temporarily receiving at least some of the blades from said plurality of blades, so that said blades extend substantially in the longitudinal direction of the tower.

The invention further proposes a wind turbine, in an intermediate assembly condition, comprising at least some blades from a plurality of blades and a tower, temporarily associated so that said blades extend substantially in the longitudinal direction of the tower.

DESCRIPTION OF PREFERRED EMBODIMENTS

As stated in the introduction, a wind turbine, in its final assembly condition, comprises in standard fashion a tower 2 surmounted by a nacelle 4 cooperating with a rotor 5 receiving a plurality of blades 3a-3c (two, three or more).

The present invention proposes contributing to the assembly of a wind turbine, by temporarily associating with the tower at least some of the blades, so that these blades extend substantially in the longitudinal direction of the tower. In other words, all or part of the blades are temporarily linked to the tower so that they extend in the same direction as the tower. The association is called temporary insofar as the blades are not intended to remain in this longitudinal position, but to be fixed to the rotor of the wind turbine in its final assembly condition.

The association of the blades and the tower can adopt various forms. For example, the blades can be fixed directly onto the tower, at one or more points of the latter. In a variant, it is possible for the blades not to be in contact with the tower, but with a structure that ensures their positioning in the longitudinal direction of the tower.

Figure 1:
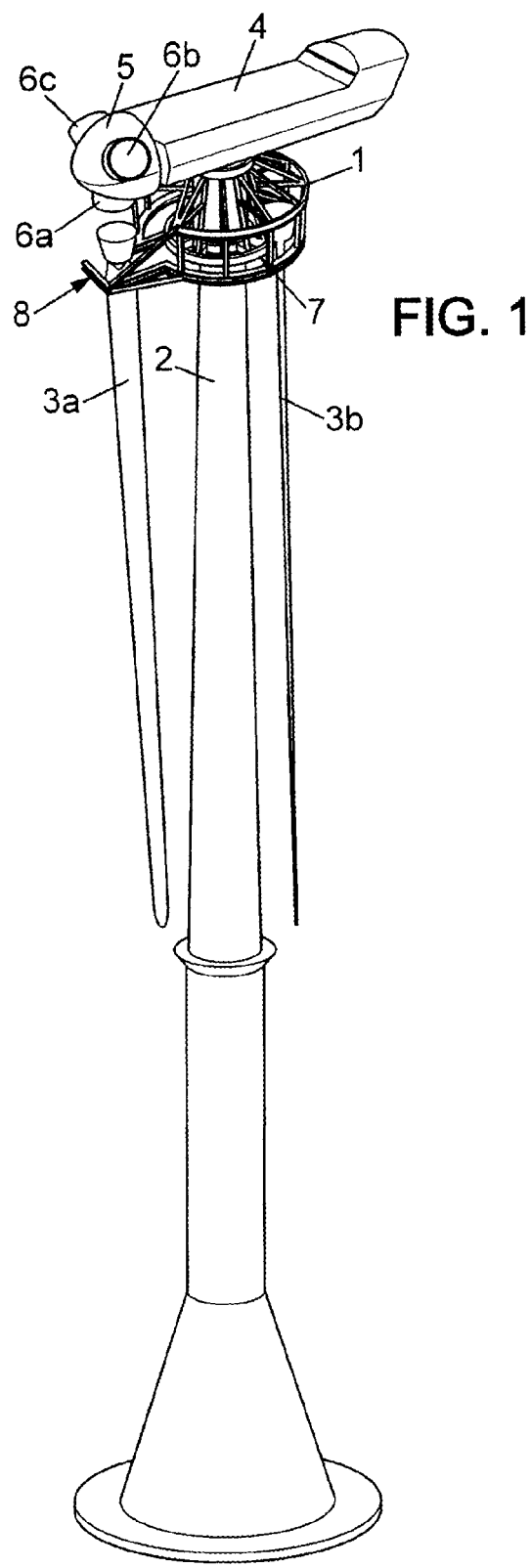
FIGS. 1 to 7 are diagrams showing a non-limitative example of successive steps for fixing blades to a rotor, the blades being initially temporarily associated with a tower, in accordance with an embodiment of the invention.

FIG. 1 shows an advantageous example of a temporary association of blades with the tower, so that the blades extend substantially along the tower. Said example of temporary association comprises the temporary attachment of the blades 3a-3c onto a support structure 1 secured to the tower 2.

The support structure 1 is fixed to the tower 2 at its centre and has a substantially circular shape, although other shapes are also possible. By way of example, the support structure could be annular around the tower 2, but having a non-circular shape, for example elliptical. In the case of an annular structure around the tower (circular or not), the shape of the structure can optionally be centred about a longitudinal axis of the tower 2, although this is not mandatory. According to another example, the support structure could be substantially rectilinear, the blades being aligned on said structure.

The attachment of the support structure 1 to the tower 2 can optionally be temporary, i.e. the support structure 1 can be separated from the tower 2, for example once the assembly of the blades onto the rotor has been completed.

In the example shown, the blades 3a-3c are fixed to the support structure 1 by their end intended to be received by the rotor 5, for example in respective angularly distributed housings 6a-6c of the rotor. Said end, thicker than the straight part of a blade, is for example retained by a double ring of the support structure 1. Said double ring forms a track 7, substantially circular in this case, on which the end of each blade rests and can optionally be moved.

The entry and exit of the blades into the support structure 1 can be achieved via an opening 8 arranged in the support structure 1, onto which the track 7 opens. The attachment of the blades 3a-3c to the support structure 1 is therefore very temporary, since these elements can be separated, for example in preparation for, within the framework of, or as a consequence of the possible subsequent assembly of the blades onto the rotor.

Other forms of support structures than that shown in FIG. 1 can be envisaged, as will be apparent to a person skilled in the art.

Advantageously, the support structure 1 secured to the tower 2 is positioned close to the upper end of the tower 2. If the nacelle 4 cooperating with the rotor 5 surmounts the tower 2 (according to need, the nacelle 4 can be placed at the apex of the tower 2 before or after the temporary association of the blades with the tower 2), the support structure 1 can even be placed in contact or almost in contact with the base of said nacelle 4, as shown in FIG. 1.

A description will be given hereinafter of the optional operations capable of implementation for example in order to assemble the blades 3a-3c onto the rotor 5.

It is assumed henceforth that the nacelle 4 cooperating with the rotor 5 surmounts the tower 2, which is for example in a vertical position. A relative movement is then carried out of at least some of the blades 3a-3c fixed temporarily onto the support structure 1 and the nacelle 4 so that said blades 3a-3c are positioned close to the rotor 5.

In the example of FIG. 1, the blade 3a rests at the opening 8 of the support structure 1. It is already close to the rotor 5, more precisely opposite the housing 6a of the rotor intended to receive it.

Figure 2:
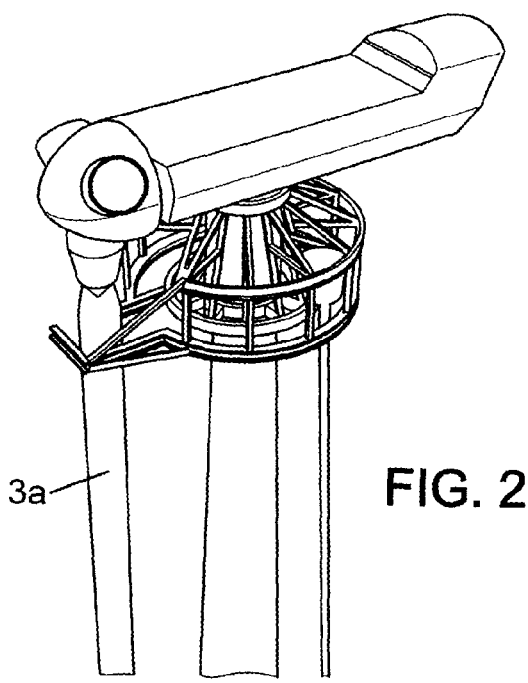

The attachment of the blade 3a into the rotor 5, by introducing the end of said blade into the corresponding housing 6a as shown in FIG. 2 is then made easy, by the proximity of these elements. The method of attachment can adopt any form that can be envisaged (holding by complementary shaping of the housing and the end of the blade, anchoring the blade in the housing, etc.) Slight lifting of the blade 3a, for example using a cylinder, can be sufficient to carry out the insertion.

As regards the other blades 3b-3c fixed temporarily onto the support structure 1, they can for example be moved substantially about a longitudinal axis of the tower 2. This can be carried out by moving these blades along the track 7 arranged in the support structure 1. Such movement can also be achieved using light means, such as cylinders or others.

Figure 3:
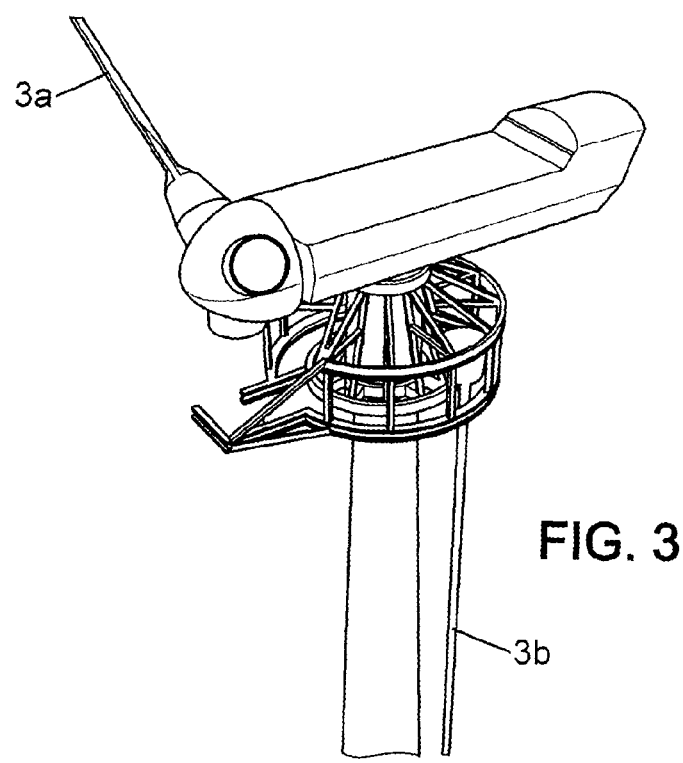
Figure 4:
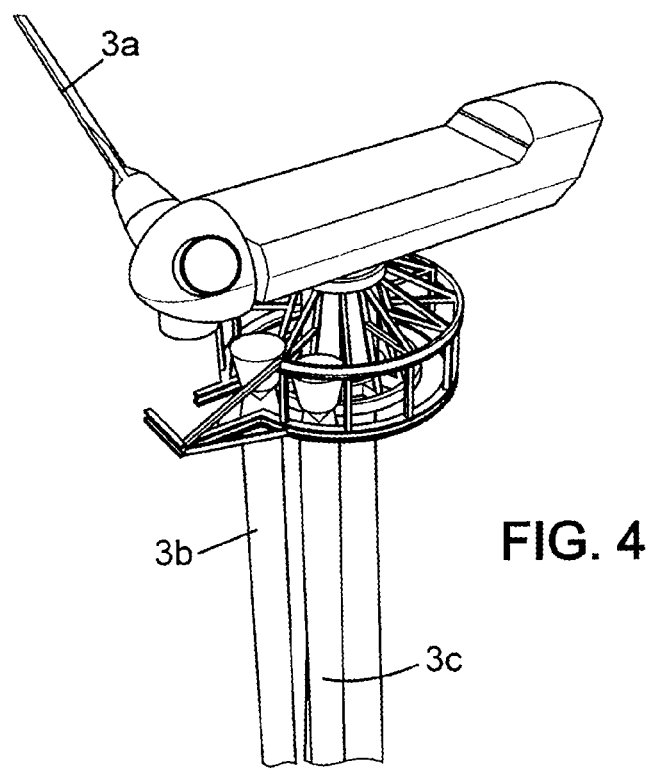
Figure 5:
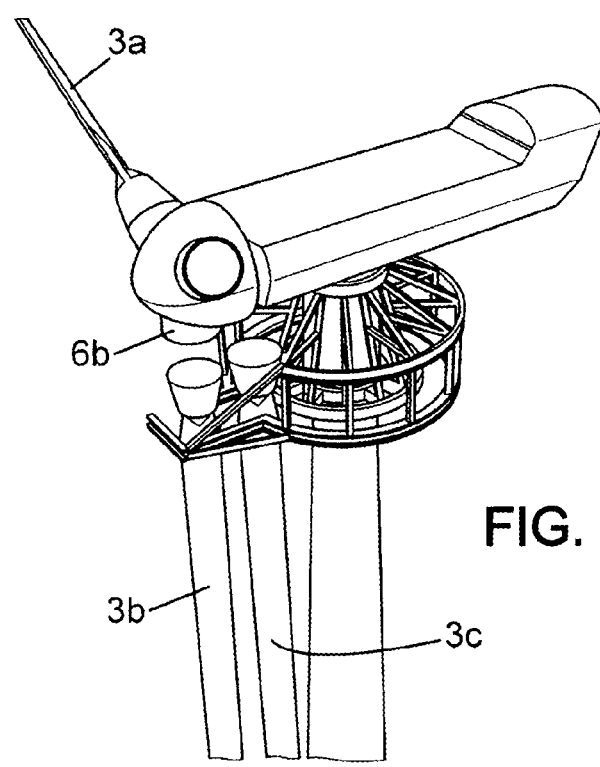

Thus, as shown in FIGS. 3 to 5, the blade 3b is moved along the track 7 from its storage location (FIG. 3) to a location situated close to the rotor 5 (FIG. 4).

Then it is brought to the opening 8 of the support structure 1 (FIG. 5). In this position, it faces the corresponding housing 6b of the rotor 5, the latter having previously or concurrently rotated for this purpose, thus leading to a distancing of the blade 3a already fixed to the rotor and its release from the support structure 1. Fixing the blade 3b into the housing 6b of the rotor 5 can then be carried out in a simple manner, as in the case of the blade 3a.

Figure 6:
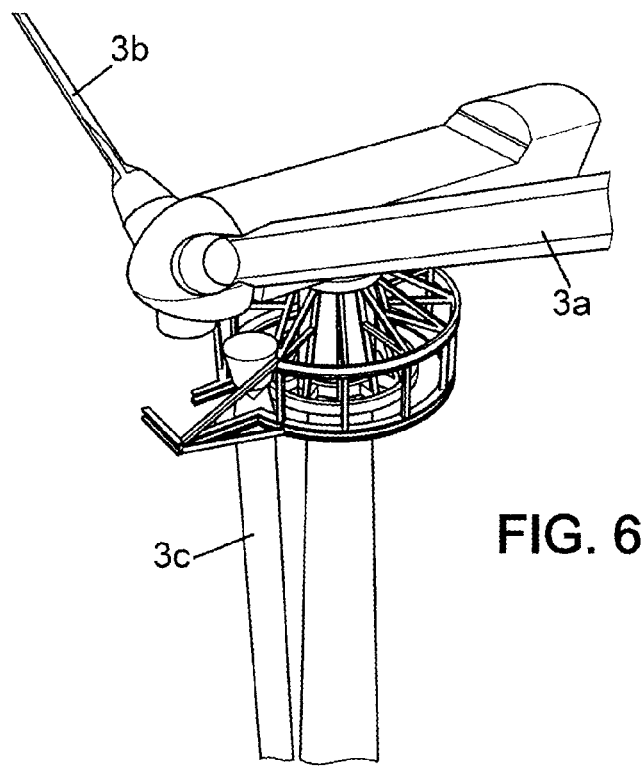
Figure 7:
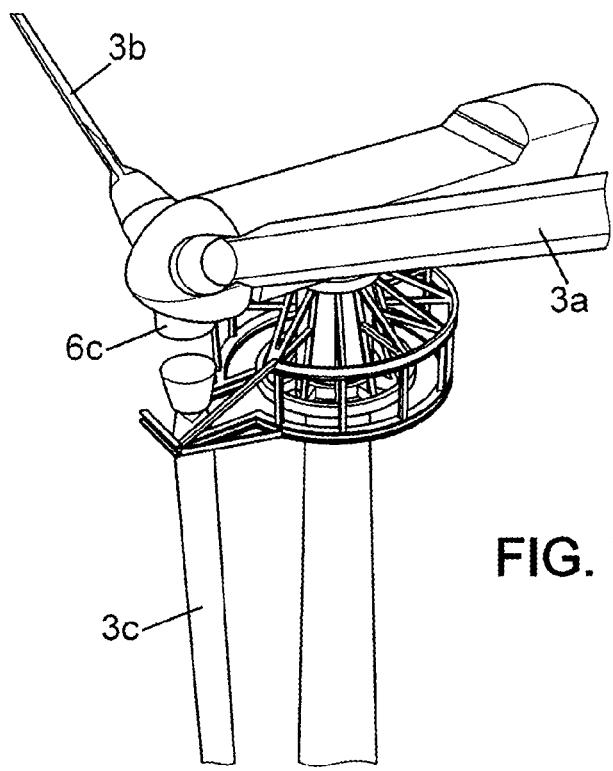

The latter steps can then be reproduced in a similar manner with respect to the blade 3c, as shown in FIGS. 6 and 7.

Other methods of moving the blades 3a-3c about a longitudinal axis of the tower 2 can be envisaged, as will be apparent to a person skilled in the art.

By way of example, the support structure 1 could be mounted mobile in rotation around the tower 2, the blades 3a-3c remaining optionally fixed within said support structure 1. In this case, it would be possible to rotate the support structure 1 around the tower 2, so as to position the blades 3a-3c successively close to the rotor 5, for example opposite the corresponding rotor housings 6a-6c.

Other methods of relative movement of the blades 3a-3c and the nacelle 4 can also be envisaged.

By way of example, it would be possible for the support structure 1 to remain fixed around the tower 2, while the nacelle 4 rotates substantially about a longitudinal axis of the tower 2. In this manner, the nacelle 4 could be rotated so as to position the rotor 5 above each of the blades successively, thus advantageously placing a blade in correspondence with the corresponding rotor housing.

According to another example, when the support structure is not circular but rectilinear, the blades can advantageously be moved into the support structure so as to be brought close to the rotor.

In the example shown in FIGS. 1 to 7, fixing the blades 3a-3c onto the rotor 5 is accompanied, during the subsequent rotation of the rotor 5, by releasing these blades from the support structure 1 secured to the tower 2.

Once the set of blades 3a-3c is mounted on the rotor 5, it is possible to detach the support structure 1 from the tower 2. This can be carried out in any suitable manner, according to the shape of the support structure 1 and its method of attachment onto the tower 2. By way of example, said structure could be lowered from the top of the tower 2 using winches.

It is understood that the operations described hereto are less complex and less expensive than those of the prior art. In fact, temporary assembly of the blades along the tower can be carried out blade by blade. Moreover, once the blades are assembled along the tower, they can be moved towards and fixed to the rotor in a simple manner, using light means such as cylinders. The use of the cranes employed in the prior art in order to lift the "rotor+blades" assembly up to the apex of the tower is avoided with the present invention.

Moreover, the temporary association with the tower of at least some blades can advantageously be carried out in a temporary position on land, while fixing the blades onto the rotor can be carried out once a final position of the wind turbine has been reached. Thus, even when an offshore wind turbine is concerned, i.e. one intended to be situated in the open sea, the temporary association can be carried out on land rather than at sea. Thus the use of heavy seagoing logistics, such as seagoing cranes, barges, vessels, etc. is avoided. Moreover the safety of the work is enhanced as it is carried out on land.

Where the final position of the wind turbine is located in a marine environment, for example at sea, it is possible advantageously to transport an assembly comprising the tower and the blades temporarily associated with the tower, advantageously as well as the nacelle and the rotor, according to the principles disclosed in FR 07 07881.

The transport of said assembly can thus be carried out by associating at least one float with said assembly, so as to provide a stable flotation of said assembly in the marine environment, the float surrounding said assembly and a lower portion of said assembly extending below said float, and by causing said assembly and the associated float to travel in the marine environment until the final position of the wind turbine is reached.

FIGS. 8 to 11 show a non-limitative example of such transport.

Figure 8:
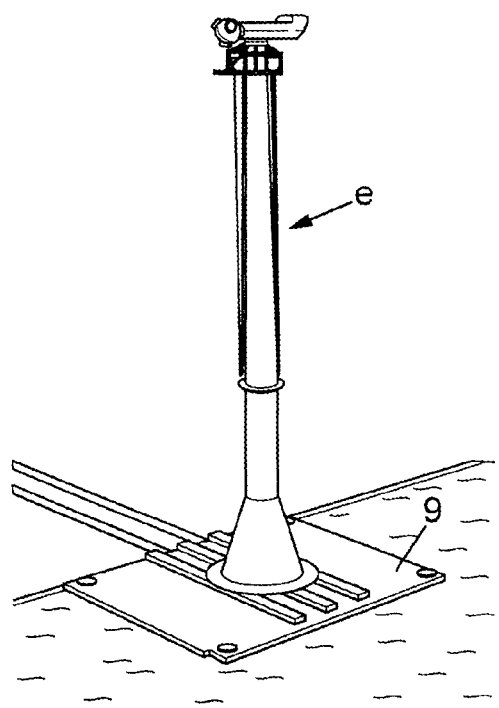
FIGS. 8 to 11 are diagrams showing a non-limitative example of marine transport of a wind turbine in a non-final assembly condition in accordance with an embodiment of the invention.

In said example, the assembly e, comprising the tower, the blades assembled temporarily along the tower, as well as the nacelle and the rotor, is firstly transferred onto a barge 9 situated alongside a quay (FIG. 8).

Figure 9:
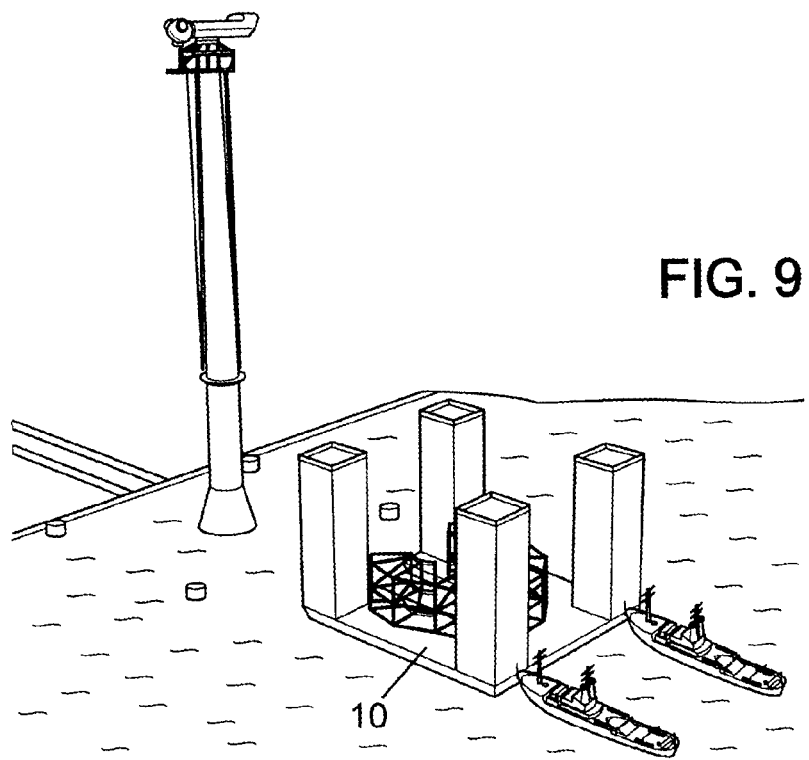
Figure 10:
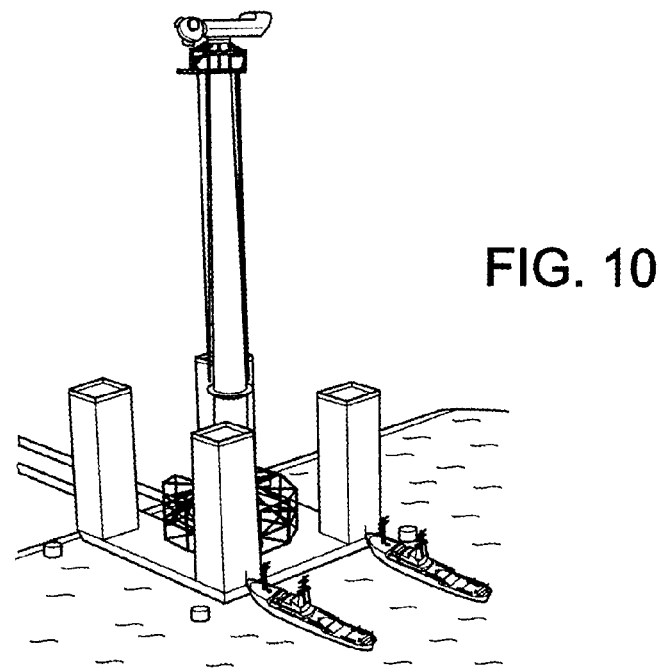

The barge 9 is then lowered into the water, thus causing the base of the tower to enter the water. A float 10 is brought in order to be associated with the assembly e, so as to provide it with a stable flotation (FIGS. 9 and 10). To this end, it surrounds said assembly e, for example at the base of the tower, and a lower portion of said assembly e extends below the float 10.

Figure 11:
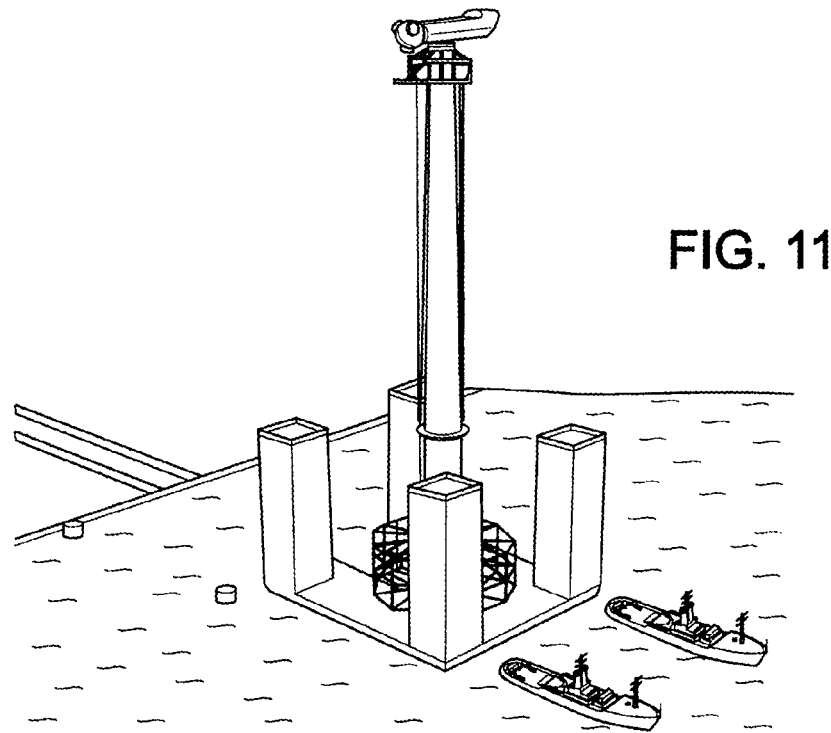

Next, the assembly e and the associated float 10 is made to travel in the marine environment, for example by towing using ships, to the final position of the wind turbine (FIG. 11).

As stated above, it is in the final position of the wind turbine that the blades can advantageously be fixed to the rotor. For this purpose, only light means are necessary. The complex work at sea provided for in the prior art in order to assemble the blades is dispensed with.

Moreover, transportation of the assembly e with the blades positioned along the tower considerably reduces its wind resistance in comparison with a wind turbine transported in its final assembly condition. The stability of the assembly is thus enhanced during its transportation in the water.

What is claimed is:

1. A system for contributing to the assembly of a wind turbine comprising, in a final assembly condition, a tower surmounted by a nacelle cooperating with a rotor receiving a plurality of blades, the system comprising:
   a support structure arranged for temporarily associating with the tower at least some blades from said plurality of blades, so that said blades are fixed temporarily onto said support structure placed securely around the tower and extending substantially in the longitudinal direction of the tower,
   said support structure being further arranged for allowing, when the nacelle surmounts the tower, a relative movement of the nacelle and at least one of the blades fixed onto the support structure, substantially about a longitudinal axis of the tower, so that said blade is positioned close to the rotor,
   wherein the support structure is rotatably mounted in a horizontal plane around the tower, and
   wherein the support structure comprises a track formed by a double ring, said double ring being arranged to retain each blade by an end of said blade intended to be received by the rotor.

2. A support structure for contributing to the assembly of a wind turbine comprising, in a final assembly condition, a tower surmounted by a nacelle cooperating with a rotor receiving a plurality of blades, the support structure being arranged for being placed securely around the tower and for fixing temporarily at least some of the blades from said plurality of blades onto their end intended to be received by the rotor, so that said blades extend substantially in the longitudinal direction of the tower, the support structure being configured to be rotatably mounted in a horizontal plane around the tower, wherein the support structure comprises a track formed by a double ring, said double ring being arranged to retain each blade by an end of said blade intended to be received by the rotor.

* * * * *